O. D. CURTIS.
HOOK OR COUPLING FOR TOWLINES.
APPLICATION FILED MAR. 16, 1921.
1,396,098.
Patented Nov. 8, 1921.
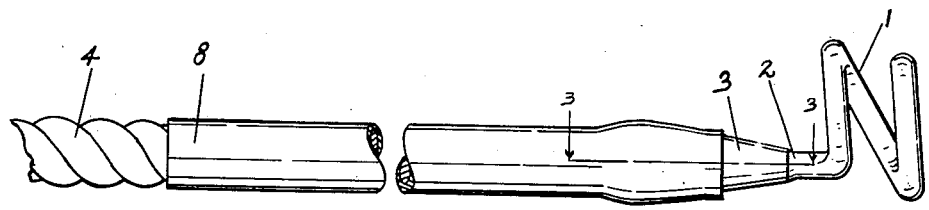
Fig. I.
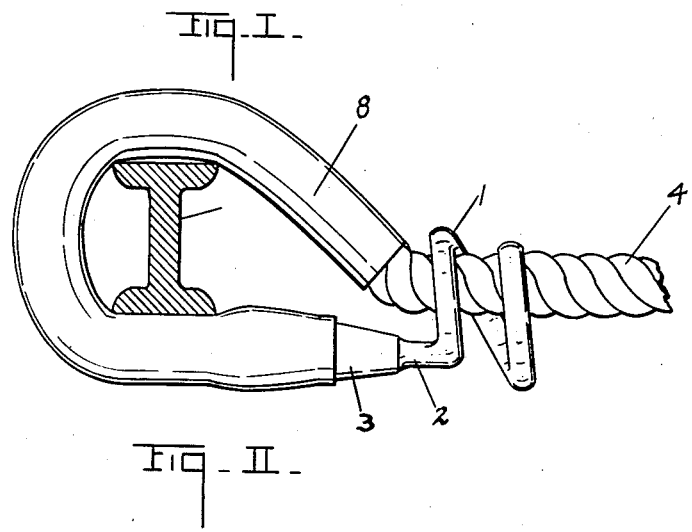
Fig. II.
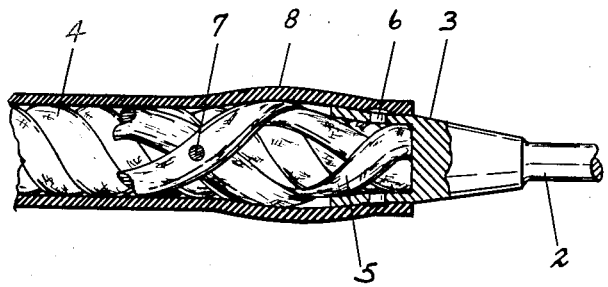
Fig. III.
INVENTOR.
O. D. CURTIS
BY *Chappell & Earl*
ATTORNEYS.

UNITED STATES PATENT OFFICE.

O. D. CURTIS, OF KALAMAZOO, MICHIGAN, ASSIGNOR OF ONE-HALF TO RICHARD H. BRIGNALL, TWO-FIFTHS TO GLEN E. CRANE, BOTH OF KALAMAZOO, MICHIGAN, AND ONE-TENTH TO RAY MYERS, OF BREEDSVILLE, MICHIGAN.

HOOK OR COUPLING FOR TOWLINES.

1,396,098.      Specification of Letters Patent.      Patented Nov. 8, 1921.

Application filed March 16, 1921. Serial No. 452,647.

*To all whom it may concern:*

Be it known that I, O. D. CURTIS, a citizen of the United States, residing at the city and county of Kalamazoo, State of Michigan, have invented certain new and useful Improvements in Hooks or Couplings for Towlines, of which the following is a specification.

This invention relates to improvements in hooks or couplings for tow lines.

The object of the invention is to provide a simple and effective spiral hook structure which is economical to manufacture and effective in use.

Objects which pertain to details will definitely appear from the detailed description to follow.

I accomplish the objects of my invention by the devices and means described in the following specification. The invention is fully defined and pointed out in the claim.

Structures which are preferred embodiments of my invention are fully illustrated in the accompanying drawing, forming a part of this specification, in which:

Figure I is a detail view of a rope with my improved hook means in position, parts being broken away.

Fig. II shows the same in hooked relation around a section of beam, such as the axle of a car and the like.

Fig. III is an enlarged detail sectional view taken on line 3—3 of Fig. I, showing details of the attachment of the rope to the hook.

In the drawing similar numerals of reference refer to similar parts throughout the several views, and the sectional view is taken looking in the direction of the little arrows at the end of the section line.

Considering the numbered parts of the drawing, the hook 1 is of spiral form, provided with a shank 2 terminating in a socket 3, to which a rope 4 is secured, the end being cut off and being braided back upon itself and inserted in the socket 3 and retained there by cross pin 6. A cross pin 7 is also put through the braided end as appears in Fig. III.

Stretched over the outside of the whole is a section of rubber hose 8. The rope in secured position is about an axle 9 in Fig. II, showing the relation of the parts and how the rubber hose section protects the parts from being marred.

I have indicated that my improved invention can be considerably modified, but I desire to claim the same specifically as well as broadly, as pointed out in the appended claim.

Having thus described my invention, what I claim as new and desire to secure by Letters Patent is:

A spirally formed hook having a shank of substantial length offset from and disposed parallel to the axis of the spiral and terminating in a longitudinally disposed socket, a rope having its end secured in said socket, and a piece of hose embracing said socket and a portion of the rope adjacent the hook and coacting therewith, providing a loop portion adapted to surround an axle or the like and prevent the hook drawing against the same.

In witness whereof, I have hereunto set my hand and seal in the presence of two witnesses.

O. D. CURTIS. [L. S.]

Witnesses:
LUELLA G. GREENFIELD,
MARGARET L. GLASGOW.